United States Patent
Tate

(10) Patent No.: US 12,332,994 B2
(45) Date of Patent: Jun. 17, 2025

(54) EXECUTION CODE PROVISION METHOD AND SOFTWARE DEVELOPMENT SYSTEM

(71) Applicant: connectFree Corporation, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 407 days.

(21) Appl. No.: 17/622,573

(22) PCT Filed: Jun. 24, 2020

(86) PCT No.: PCT/JP2020/024799
§ 371 (c)(1),
(2) Date: Dec. 23, 2021

(87) PCT Pub. No.: WO2020/262456
PCT Pub. Date: Dec. 30, 2020

(65) Prior Publication Data
US 2022/0269773 A1 Aug. 25, 2022

(30) Foreign Application Priority Data
Jun. 26, 2019 (JP) ................................ 2019-119106

(51) Int. Cl.
G06F 21/51 (2013.01)
G06F 8/60 (2018.01)

(52) U.S. Cl.
CPC .............. *G06F 21/51* (2013.01); *G06F 8/60* (2013.01); *G06F 2221/033* (2013.01)

(58) Field of Classification Search
CPC ...... G06F 21/51; G06F 8/60; G06F 2221/033; G06F 8/41; G06F 9/44589
See application file for complete search history.

(56) References Cited

U.S. PATENT DOCUMENTS

| 6,128,774 A | 10/2000 | Necula et al. |
| 2003/0154468 A1 | 8/2003 | Gordon et al. |
| 2004/0010784 A1 | 1/2004 | Koseki et al. |

(Continued)

FOREIGN PATENT DOCUMENTS

| JP | H04-312130 A | 11/1992 |
| JP | 2001-075814 A | 3/2001 |

(Continued)

OTHER PUBLICATIONS

Shinagawa et al., "Kernel Support of Fine-grained Protection Domains for Extention Components," Journal of Information Processing Society of Japan 40(6) (1999).

(Continued)

*Primary Examiner* — Abiy Getachew
(74) *Attorney, Agent, or Firm* — Merchant & Gould P.C.

(57) ABSTRACT

A solution can ensure the security of an application program. An execution code provision method includes: a step of generating a source code according to a user operation; a step of generating an intermediate representation from the source code; a step of verifying whether or not the intermediate representation satisfies a predetermined rule or regulation; and a step of realizing execution of an execution code generated from the intermediate representation when the intermediate representation satisfies the predetermined rule or regulation.

10 Claims, 6 Drawing Sheets

(56) References Cited

U.S. PATENT DOCUMENTS

| | | | |
|---|---|---|---|
| 2004/0243986 A1 | 12/2004 | Nishiyama | |
| 2007/0043957 A1* | 2/2007 | Benoit | G06Q 20/3552 713/181 |
| 2007/0169039 A1* | 7/2007 | Lin | G06F 8/34 717/146 |
| 2008/0148060 A1* | 6/2008 | Thorell | G06F 21/51 380/28 |
| 2008/0163181 A1* | 7/2008 | Guo | G06F 8/4442 717/149 |
| 2014/0304815 A1 | 10/2014 | Maeda | |
| 2016/0004517 A1* | 1/2016 | Safary | G06F 8/436 717/131 |
| 2017/0220802 A1 | 8/2017 | Huang et al. | |
| 2017/0315903 A1* | 11/2017 | David | G06F 8/73 |
| 2018/0349614 A1* | 12/2018 | Ionescu | G06F 21/577 |
| 2022/0269773 A1* | 8/2022 | Tate | G06F 21/51 |

FOREIGN PATENT DOCUMENTS

| | | | |
|---|---|---|---|
| JP | 2002522844 A | 7/2002 | |
| JP | 2002527819 A | 8/2002 | |
| JP | 2003-122730 A | 4/2003 | |
| JP | 2003-248637 A | 9/2003 | |
| JP | 2004-021336 A | 1/2004 | |
| JP | 2006-522972 A | 10/2006 | |
| JP | 2013140513 A * | 7/2013 | G06F 8/61 |
| JP | 2014-174577 A | 9/2014 | |
| TW | 1524206 B | 3/2016 | |
| TW | 201721497 A | 6/2017 | |
| TW | 1606396 B | 11/2017 | |
| WO | 200010081 A2 | 2/2000 | |
| WO | 200022528 A1 | 4/2000 | |

OTHER PUBLICATIONS

Office Action issued for Taiwanese Patent Application No. 109121560 dated Sep. 28, 2023, with machine English translation.

Office Action issued for Japanese Patent Application No. 2019-119106 dated Sep. 26, 2023, with machine English translation.

International Search Report for PCT/JP2020/024799 (Sep. 15, 2020).

Search Report for European Patent Application No. 20833083.7 (Jun. 20, 2023).

Office Action for Japanese Patent Application No. 2019-119106 (May 9, 2023).

Japanese Office Action received for JP Application No. 2023-22052 on Aug. 13, 2024, 46 pgs.

* cited by examiner

EXECUTION CODE PROVISION METHOD AND SOFTWARE DEVELOPMENT SYSTEM

This application is a National Stage of PCT/JP2020/024799, filed Jun. 24, 2020, which claims priority to Japanese Patent Application No. 2019-119106, filed Jun. 26, 2019, which applications are incorporated herein by reference. To the extent appropriate, a claim of priority is made to each of the above-disclosed applications.

TECHNICAL FIELD

The present disclosure relates to an execution code provision method and a software development system.

BACKGROUND ART

The development of information and communication technology (ICT) has been remarkable in recent years, and devices connected to a network, such as the Internet, are not limited to information processing devices, such as conventional personal computers or smartphones, and are spreading to various things. Such a technology trend is called "IoT (Internet of Things)", and various technologies and services have been proposed and put into practical use. In the future, a world is envisioned in which billions of people on Earth and tens of billions or trillions of devices are connected at the same time. In order to realize such a networked world, it is necessary to provide a solution that is simpler, safer, and more freely connected.

With the intelligentization of devices used in IoT (also referred to as "edge devices"), it is possible to execute various kinds of application programs in the edge devices. On the other hand, it is not easy to increase the security for edge devices to the same level as the security for servers or personal computers due to resource constraints and the like. Therefore, it is important to verify the application programs installed on the edge devices.

For example, JP 2014-174577 A (Patent Document 1) discloses an improvement of a static analysis tool for verifying the vulnerability of a Web application at the source code level.

CITATION LIST

Patent Document

Patent Document 1: JP 2014-174577 A

SUMMARY OF THE INVENTION

Problem to be Solved by the Invention

Application programs used in edge devices and the like are often distributed as intermediate representations before the generation of execution code, not in the form of source code. By adopting such an intermediate representation, there is an advantage that the know-how and the like included in the source code can be concealed and the amount of data can be reduced.

As disclosed in Patent Document 1 described above, it is common to analyze the source code to evaluate a security hole or vulnerability, but it is not easy to evaluate security hole or vulnerability in formats other than the source code.

A typical object of the present disclosure is to provide a solution that can ensure the security of an application program, which is suitable for an edge device or the like.

Means for Solving Problem

An execution code provision method according to an aspect of the present disclosure includes: a step of generating a source code according to a user operation; a step of generating an intermediate representation from the source code; a step of verifying whether or not the intermediate representation satisfies a predetermined rule or regulation; and a step of realizing execution of an execution code generated from the intermediate representation when the intermediate representation satisfies the predetermined rule or regulation.

The step of realizing the execution of the execution code may include a step of generating the execution code from the intermediate representation on condition that the intermediate representation satisfies the predetermined rule or regulation.

The step of realizing the execution of the execution code may include a step of allowing the execution of the execution code generated from the intermediate representation on condition that the intermediate representation satisfies the predetermined rule or regulation.

The execution code provision method may further include a step of evaluating validity of the execution code based on the certificate issued in association with the intermediate representation, from which the execution code has been generated, when a controller in which the execution code is executed is started.

The verification step may include a step of issuing a certificate associated with the intermediate representation when the intermediate representation satisfies the predetermined rule or regulation, and the step of allowing the execution of the execution code generated from the intermediate representation may include a step of determining whether or not the execution code is executable based on the certificate.

The verification step may include a step of notifying a user of a content that the predetermined rule or regulation is not satisfied when the intermediate representation does not satisfy the predetermined rule or regulation.

A software development system according to another aspect of the present disclosure includes: a software development device for supporting generation of a source code; and a verification server accessible from the software development device. The software development device includes a means for generating an intermediate representation from the source code. The verification server includes a means for verifying whether or not the intermediate representation satisfies a predetermined rule or regulation. When the intermediate representation satisfies the predetermined rule or regulation, execution of an execution code generated from the intermediate representation is realized.

Effect of the Invention

According to the present disclosure, it is possible to provide a solution that can ensure the security of an application program.

MODE(S) FOR CARRYING OUT THE INVENTION

Figure 1:
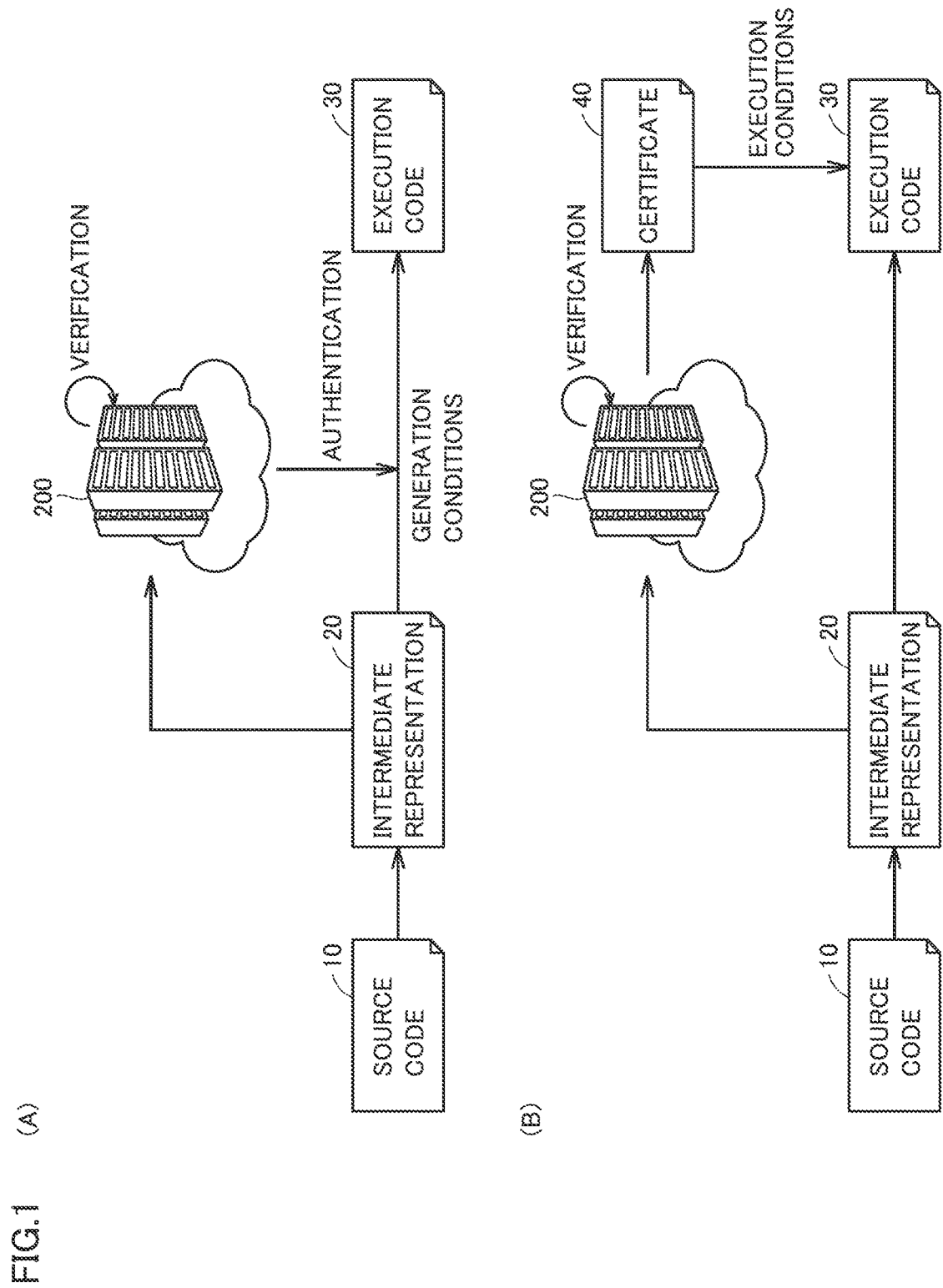
FIG. 1 is a diagram for describing an overview of processing in a software development system according to the present embodiment.

An embodiment according to the present disclosure will be described in detail with reference to the diagrams. In addition, the same or corresponding portions in the diagrams are denoted by the same reference numerals, and the description thereof will not be repeated.

A. Overview

First, an overview of processing in a software development system 1 according to the present embodiment will be described. In the present embodiment, an intermediate representation 20 itself generated from a source code 10 is verified, and the generation of a corresponding execution code 30 or the execution of the generated execution code 30 is allowed on condition that the verification result is appropriate. In the verification of the intermediate representation 20, it is determined that the intermediate representation 20 is appropriate when a predetermined rule or regulation is satisfied.

In this specification, the "intermediate representation" includes a machine language for a corresponding virtual machine, which is generated from a source code written in an arbitrary programming language (usually a high-level language) by targeting a specific virtual machine, in a compiler base. However, the "intermediate representation" does not necessarily have to be in a binary format, and may be expressed in a format similar to the natural language such as an assembler language. In addition, the "intermediate representation" may adopt any representation format as long as the "intermediate representation" is generated by targeting a specific virtual machine.

Typically, the "intermediate representation" is generated independently of the platform and architecture on which the execution code 30 is executed. A static compiler may be used to generate the intermediate representation 20 from the source code 10. In addition, the "intermediate representation" may be compiled as the execution code 30 directed to a specific platform and architecture. The "intermediate representation" and the "execution code" are generated as a set. In the "intermediate representation", the amount of data is reduced as compared with the original source code, and the described processing itself can be made more efficient.

The generation of the intermediate representation 20 from the source code 10 is basically a one-way conversion, and accordingly, it is difficult to completely restore the source code 10 from the intermediate representation 20. Bidirectional conversion is also possible between the intermediate representation 20 and the execution code 30.

FIG. 1 is a diagram for describing an overview of processing in the software development system 1 according to the present embodiment. FIG. 1(A) shows an example in which the successful verification of the intermediate representation 20 generated from the source code 10 is the generation condition of the execution code 30. FIG. 1(B) shows an example in which the successful verification of the intermediate representation 20 generated from the source code 10 is the execution condition of the execution code 30 generated from the intermediate representation 20.

As shown in FIGS. 1 (A) and 1 (B), the intermediate representation 20 generated from the source code 10 is verified by an arbitrary subject. In the examples shown in FIGS. 1 (A) and 1 (B), an example in which a verification server 200 verifies the intermediate representation 20 is shown, but the invention is not limited thereto, and the verification may be performed by any subject.

Referring to FIG. 1(A), when the verification result from the verification server 200 is appropriate, the verification server 200 gives authentication to the intermediate representation 20. The execution code 30 is generated from the intermediate representation 20 with authentication for the intermediate representation 20 as a generation condition. Thus, the verification for the intermediate representation 20 may be included in the generation condition of the execution code 30. By adopting such a generation condition, the security of the generated execution code 30 can be enhanced.

Referring to FIG. 1(B), when the verification result from the verification server 200 is appropriate, the verification server 200 issues a certificate 40 including authentication for the intermediate representation 20. At the same time, the execution code 30 is generated from the intermediate representation 20. The generated execution code 30 may be executed on condition that the corresponding certificate 40 is present. Thus, the presence of the certificate 40 for the intermediate representation 20 may be included in the execution condition of the execution code 30. By adopting such an execution condition, it is possible to reduce the possibility that the execution code 30 is executed in a state in which the security is not ensured.

As described above, in a series of processes in the present embodiment, when the intermediate representation 20 satisfies a predetermined rule or regulation (when the verification result is appropriate), authentication is given to allow the generation or execution of the execution code 30 corresponding to the intermediate representation 20. On the contrary, when the intermediate representation 20 does not satisfy a predetermined rule or regulation (when the verification result is not appropriate), authentication is not given and accordingly, the execution code 30 corresponding to the intermediate representation 20 cannot be generated or executed. That is, when the intermediate representation 20 satisfies a predetermined rule or regulation, the execution of the execution code 30 generated from the intermediate representation 20 is realized.

As a process for realizing the execution of the execution code 30, as shown in FIG. 1(A), a process of generating the execution code 30 from the intermediate representation 20 may be adopted on condition that the intermediate representation 20 satisfies a predetermined rule or regulation. Alternatively, as a process for realizing the execution of the execution code 30, as shown in FIG. 1(B), a process of allowing the execution of the execution code 30 generated from the intermediate representation 20 may be adopted on condition that the intermediate representation 20 satisfies a predetermined rule or regulation. At this time, whether or not to allow the execution of the execution code 30 generated from the intermediate representation 20 may be determined based on the certificate 40 associated with the intermediate representation 20. In addition, whether or not the execution is possible may be determined according to the execution environment of the execution code 30 (a processor or a microcomputer including a processor).

As described above, in the present embodiment, by verifying the intermediate representation 20 instead of the source code 10, safety risks included in the application program can be more efficiently found in a state in which the know-how and the like included in the source code 10 are concealed. In addition, by verifying the intermediate representation 20, it is not necessary to prepare a plurality of verification rule sets according to the type of programming language used in the description of the source code 10. As a result, it is possible to realize efficient verification.

Next, an example of a procedure for generating the execution code 30 using the software development system 1 according to the present embodiment will be described.

Figure 2:
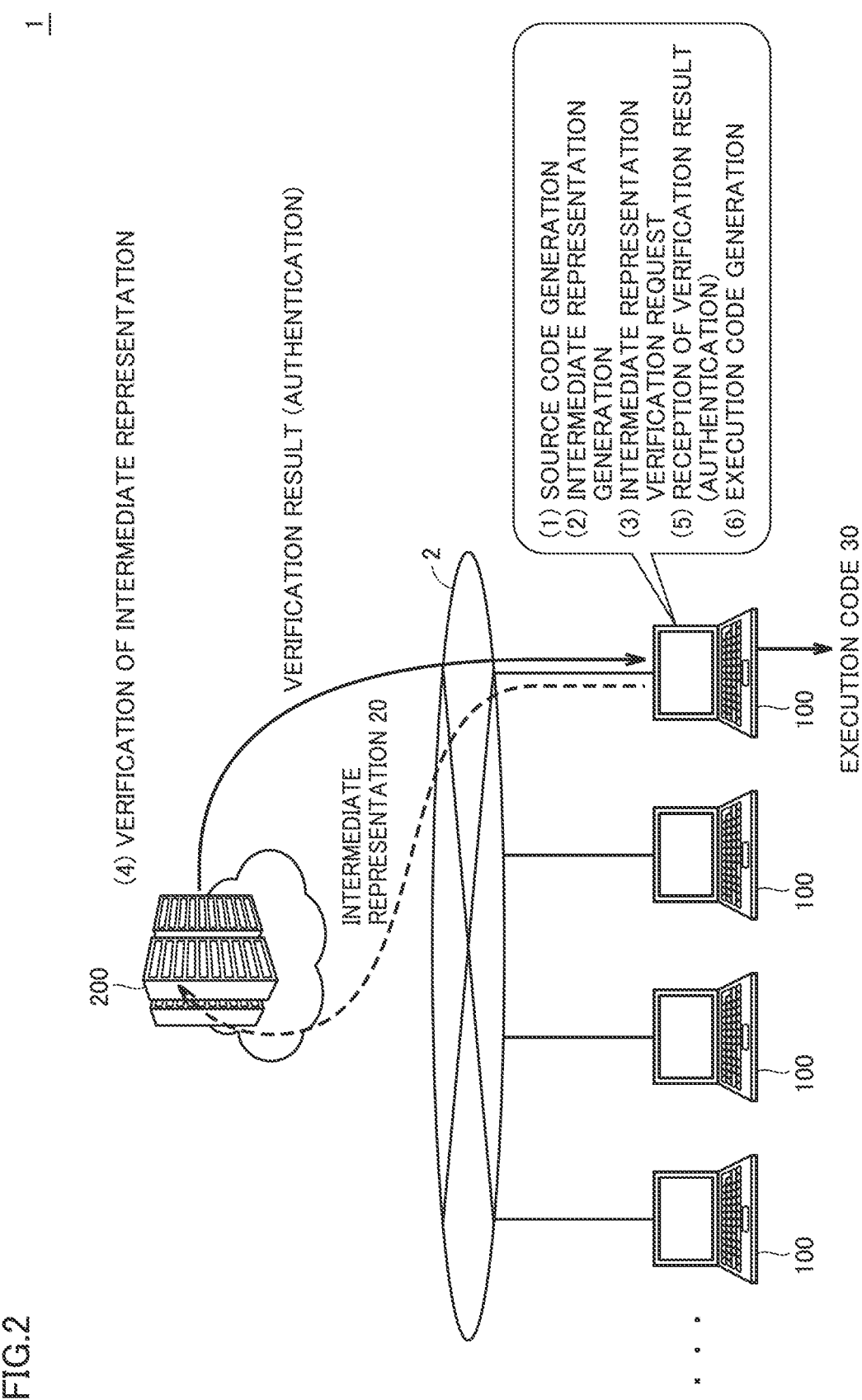
FIG. 2 is a diagram showing an overview of a procedure for generating an execution code from a source code in the software development system according to the present embodiment.
Figure 3:
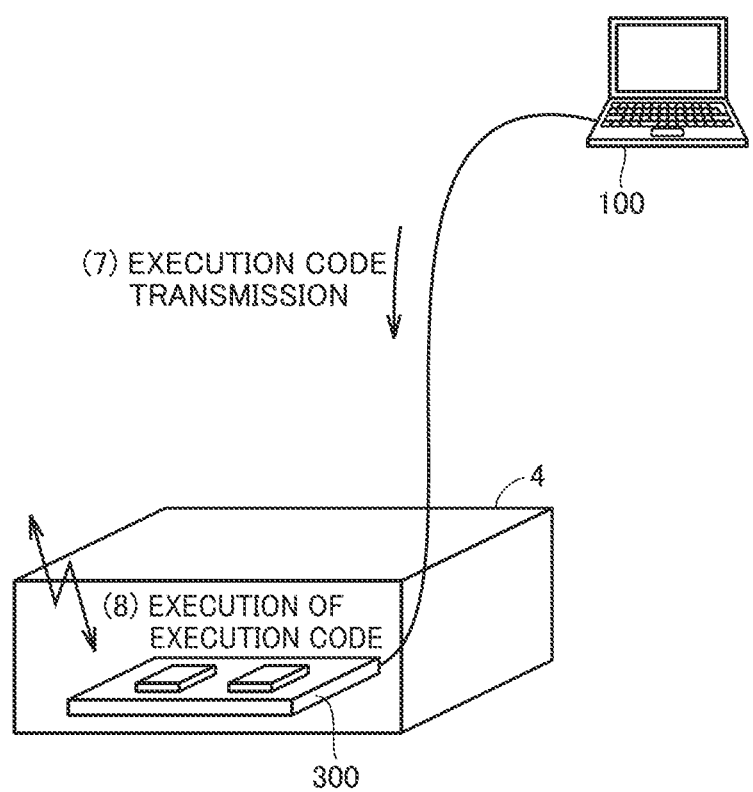
FIG. 3 is a diagram showing an overview of a procedure for generating an execution code from a source code in the software development system according to the present embodiment.

FIGS. 2 and 3 are diagrams showing an overview of a procedure for generating the execution code 30 from the source code 10 in the software development system 1 according to the present embodiment.

Referring to FIG. 2, the software development system 1 includes one or more software development devices 100 and the verification server 200 accessible from the software development device 100 through the Internet 2 or the like.

The software development device 100 supports the creation of an application program executed by a controller 300 included in an edge device 4. However, the technical scope of the invention is not limited to the creation of an application program executed by the edge device 4, and can be applied to the creation of an application program executed by any computing device.

An integrated development environment (IDE) is provided for the software development device 100, so that the user can create an arbitrary application program in the integrated development environment.

The controller 300 included in the edge device 4 is an example of a computing device, and includes a processor. The edge device 4 may be any device, but typically, factory facilities, various devices in the home, social infrastructure equipment, movable bodies such as vehicles, arbitrary portable devices, and the like are assumed. As will be described later, the controller 300 has a processor, so that it is possible to execute an application program from the software development device 100.

First, the user generates a source code by using the software development device 100 ((1) Source code generation). Then, the generated source code is compiled by the software development device 100 to generate the intermediate representation 20 ((2) Intermediate representation generation).

The intermediate representation 20 is verified before the execution code 30 is generated from the intermediate representation 20. In the example shown in FIG. 2, the generated intermediate representation 20 is transmitted to the verification server 200 ((3) Intermediate representation verification request). Then, the verification server 200 verifies the intermediate representation 20 from the software development device 100 ((4) Verification of intermediate representation). The verification server 200 responds to the software development device 100 with the verification result. If the target intermediate representation 20 passes all the verifications, the verification server 200 transmits an authentication indicating that the verification results are appropriate to the software development device 100.

When the software development device 100 receives the authentication indicating that the verification results are appropriate from the verification server 200 ((5) Reception of verification result (authentication)), the software development device 100 generates the execution code 30 from the intermediate representation 20 ((6) Execution code generation).

Then, the software development device 100 transmits the generated execution code 30 to the controller 300 of the edge device 4 ((7) Execution code transmission). Then, the controller 300 of the edge device 4 executes the transmitted execution code 30 as needed ((8) Execution of execution code).

Due to the series of processes shown in FIGS. 2 and 3, a secure application program can be executed in the controller 300 of the edge device 4.

B. Hardware Configuration Example

Next, a hardware configuration example of a main device configuring the software development system 1 according to the present embodiment will be described.

(b1: Software Development Device 100)

The software development device 100 is typically realized by a general-purpose computer.

Figure 4:
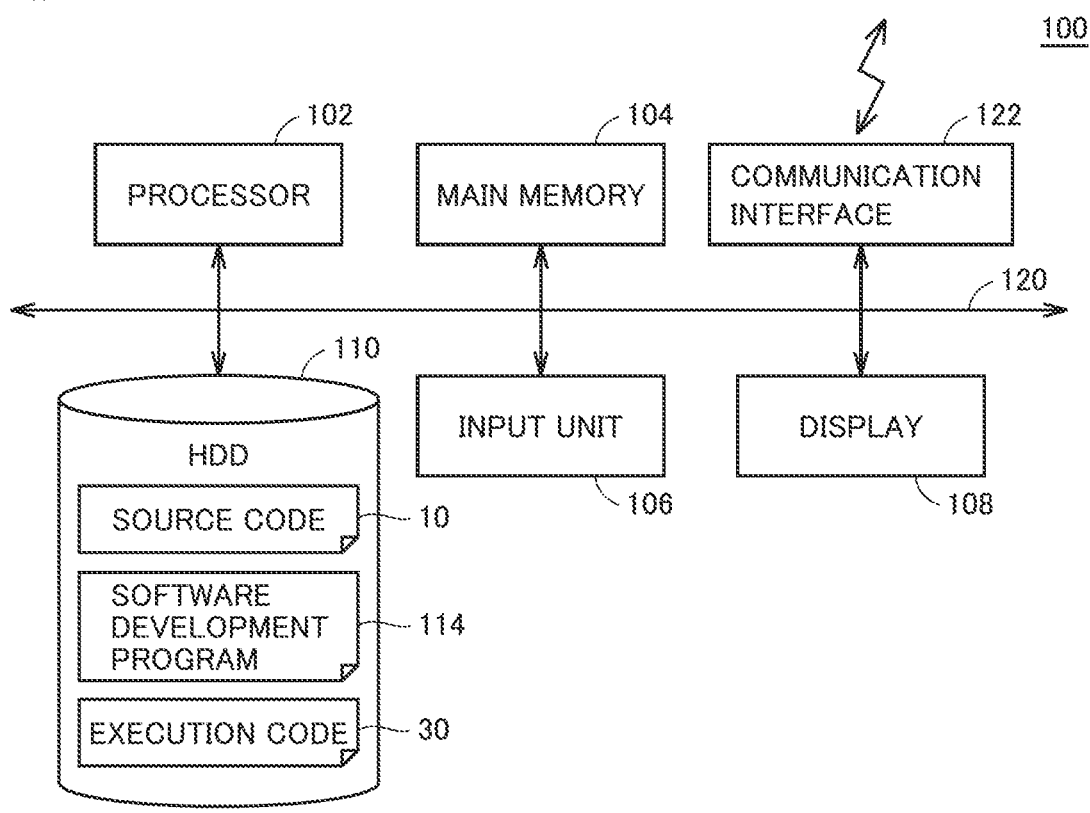
FIG. 4 is a schematic diagram showing a hardware configuration example of a software development device according to the present embodiment.

FIG. 4 is a schematic diagram showing a hardware configuration example of the software development device 100 according to the present embodiment. Referring to FIG. 4, the software development device 100 includes a processor 102, a main memory 104, an input unit 106, a display 108, a hard disk 110, and a communication interface 122 as main components. These components are connected to each other through an internal bus 120.

The processor 102 may be, for example, a CPU (Central Processing Unit) or a GPU (Graphics Processing Unit). A plurality of processors 102 may be disposed, or the processor 102 having a plurality of cores may be adopted.

The main memory 104 is a volatile storage device, such as a DRAM (Dynamic Random Access Memory) or a SRAM (Static Random Access Memory). The hard disk 110 holds various programs executed by the processor 102 or various kinds of data. In addition, instead of the hard disk 110, a non-volatile storage device such as an SSD (Solid State Drive) or a flash memory may be adopted. Among the programs stored in the hard disk 110, a designated program code is loaded to the main memory 104, and the processor 102 sequentially executes computer-readable instructions included in the program code loaded to the main memory 104 to realize various functions described later.

Typically, the hard disk 110 stores the source code 10 arbitrarily generated by the user, a software development program 114 for realizing an integrated development environment, and the execution code 30 generated from the source code 10. The software development program 114 generates the execution code 30 from the source code 10 arbitrarily generated by the user through the intermediate representation 20, and includes a module for providing an application program development environment. However, the generation or execution of the corresponding execution code 30 is allowed on condition that the verification result of the intermediate representation 20 is appropriate.

The input unit 106 receives an input operation of the user who operates the software development device 100. The input unit 106 may be, for example, a keyboard, a mouse, a touch panel disposed on a display device, or an operation button disposed on the housing of the software development device 100.

The display 108 displays the processing result of the processor 102 and the like. The display 108 may be, for example, an LCD (Liquid Crystal Display) or an organic EL (Electro-Luminescence) display.

The communication interface 122 is in charge of data exchange with the verification server 200. The communication interface 122 may include, for example, an Ethernet (registered trademark) port for communication over the Internet.

In addition, the entirety or part of the software development device 100 may be realized by using a hard-wired circuit such as an ASIC (Application Specific Integrated Circuit) in which a circuit corresponding to computer-readable instructions is provided. In addition, the entirety or part of the software development device 100 may be realized by using a circuit corresponding to computer-readable instructions on an FPGA (field-programmable gate array). In addition, the entirety or part of the software development device 100 may be realized by appropriately combining the processor 102, a main memory, an ASIC, an FPGA, and the like.

The software development device 100 may further include a component for reading the stored program or the like from the non-transitory media that stores the software development program 114 including computer-readable instructions. The media may be, for example, an optical medium, such as a DVD (Digital Versatile Disc), or a semiconductor medium, such as a USB memory.

In addition, the software development program 114 may not only be installed on the software development device 100 through the media, but also be provided from a distribution server on the network.

(b2: Verification Server 200)

The verification server 200 is also typically realized by a general-purpose computer.

Figure 5:
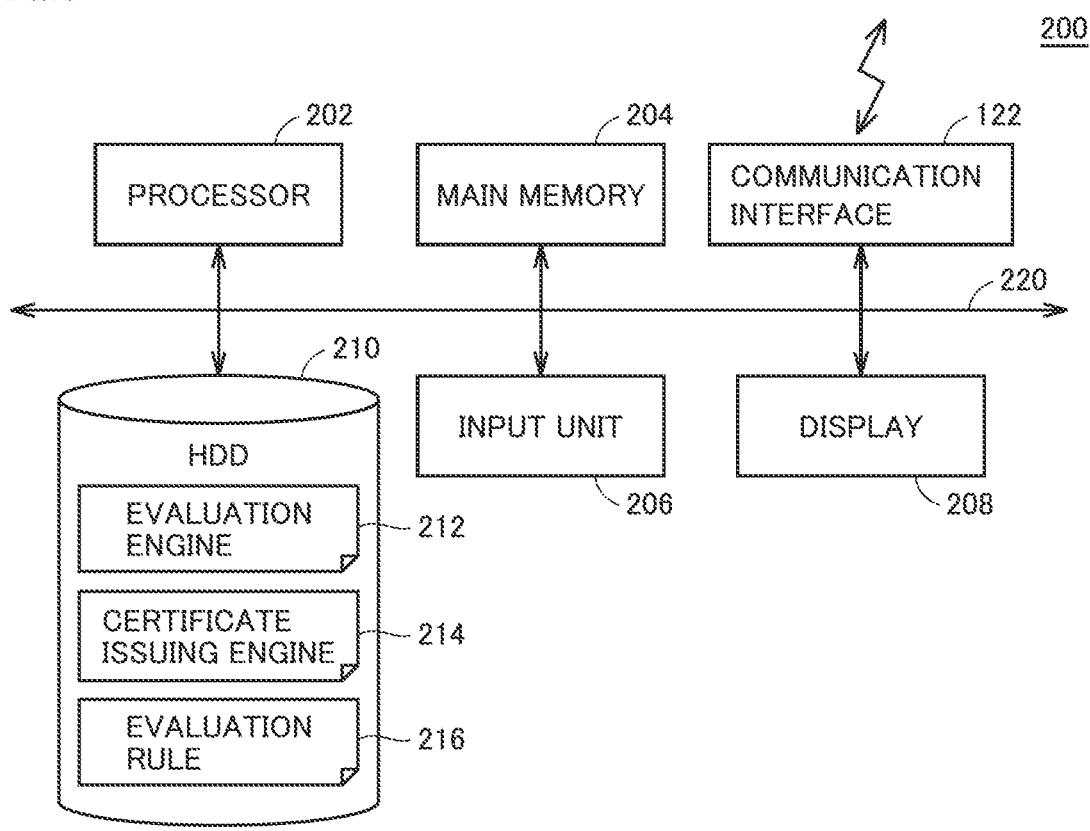
FIG. 5 is a schematic diagram showing a hardware configuration example of a verification server according to the present embodiment.

FIG. 5 is a schematic diagram showing a hardware configuration example of the verification server 200 according to the present embodiment. Referring to FIG. 5, the verification server 200 includes one or more processors 202, a main memory 204, an input unit 206, a display 208, a hard disk 210, and a communication interface 222 as main components. These components are connected to each other through an internal bus 220.

The processor 202 is, for example, a CPU or a GPU. A plurality of processors 202 may be disposed, or the processor 202 having a plurality of cores may be adopted.

The main memory 204 is a volatile storage device, such as a DRAM or an SRAM. The hard disk 210 holds various kinds of data or various programs executed by the processor 202. In addition, instead of the hard disk 210, a non-volatile storage device such as an SSD or a flash memory may be adopted. Among the programs stored in the hard disk 210, a designated program code is loaded to the main memory 204, and the processor 202 sequentially executes computer-readable instructions included in the program code loaded to the main memory 204 to realize various functions described later.

Typically, the hard disk 210 stores an evaluation engine 212 for executing evaluation processing in response to a request from the outside, a certificate issuing engine 214 for issuing a certificate according to the evaluation result from the evaluation engine 212, and an evaluation rule 216 used for the evaluation processing of the evaluation engine 212. The evaluation engine 212 verifies whether or not the intermediate representation 20 satisfies a predetermined rule or regulation. The certificate issuing engine 214 issues the certificate 40 associated with the intermediate representation 20 when the intermediate representation 20 satisfies a predetermined rule or regulation. Details of the operations, data structures, and the like of these elements will be described later.

The input unit 206 receives an input operation of a user who operates the controller 300. The display 208 displays the processing result of the processor 202 and the like.

The communication interface 222 is in charge of data exchange with the software development device 100. The communication interface 222 may include, for example, an Ethernet (registered trademark) port for communication over the Internet.

In addition, the entirety or part of the verification server 200 may be realized by using a hard-wired circuit such as an ASIC in which a circuit corresponding to computer-readable instructions is provided. In addition, alternatively, the entirety or part of the verification server 200 may be realized by using a circuit corresponding to computer-readable instructions on the FPGA. In addition, the entirety or part of the verification server 200 may be realized by appropriately combining the processor 202, a main memory, an ASIC, an FPGA, and the like.

In addition, a program required for execution may not only be installed on the verification server 200 through the media but also be provided from a distribution server on the network.

C. Verification Process

Next, a verification process in the software development system 1 according to the present embodiment will be described.

As described above, the verification of the intermediate representation 20 in the present embodiment includes a process of determining whether or not the intermediate representation 20 satisfies a predetermined rule or regulation.

The predetermined rule or regulation includes conditions for the application program (intermediate representation 20 and corresponding execution code 30) to be secure. Typical conditions for such security include the following.

(1) Does not include a memory operation (or dangerous memory operation) whose security cannot be confirmed (or such a memory operation is not compilable)

(2) There is no undefined operation in the code (3) Error handling syntax is not missing (error handling syntax is properly included)

(4) Does not include disordered error handling

The memory operation (or dangerous memory operation) for which the security in the above (1) cannot be confirmed includes memory access to the system area or secure area and memory operations, such as block erasure or block writing for the memory area.

The undefined operation in the above (2) includes a procedure or a function for which processing is not defined in the code.

The error handling syntax in the above (3) includes a description that defines processing when an exception occurs.

The disordered error handling in the above (4) includes excessive error handling when an exception occurs.

In addition, the predetermined rule or regulation includes that a so-called backdoor is not present in the application program (intermediate representation 20 and corresponding execution code 30). The backdoor is a function or connection port for a (usually malicious) third party to access the application program in a way that the user of the application program does not recognize. In the verification of the intermediate representation 20, it is determined whether or not the access route from the outside is included in the intermediate representation 20.

The verification process as described above may be realized by referring to the evaluation rule 216 (FIG. 5) including a predetermined rule or regulation, or a verification model for realizing the verification process may be sequentially updated by using machine learning, such as so-called AI (Artificial Intelligence).

The verification process in the software development system 1 according to the present embodiment may be executed by the verification server 200 or may be executed by the software development device 100. When the verification process is executed by the verification server 200, this may be implemented in the form of cloud computing. In addition, when the verification process is executed by the software development device 100, the evaluation rule 216 certified by an external certification authority may be used.

Regarding the verification process in the software development system 1 according to the present embodiment, the user or the like may be notified of the details of the content determined not to satisfy the predetermined rule or regulation.

D. Processing Procedure

Next, a processing procedure in the software development system 1 according to the present embodiment will be described.

Figure 6:
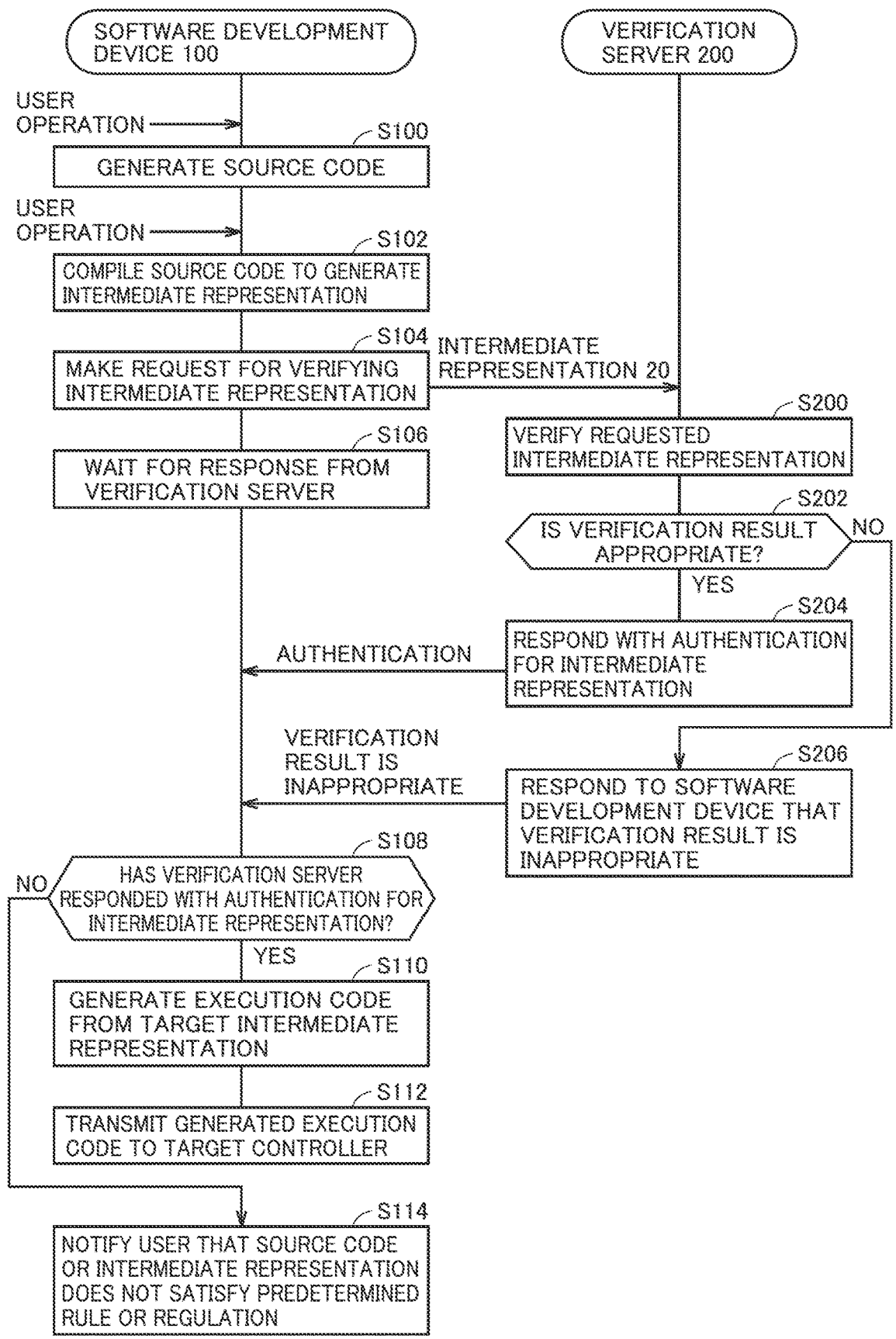
FIG. 6 is a flowchart showing an example of a processing procedure in the software development system according to the present embodiment.

FIG. 6 is a flowchart showing an example of a processing procedure in the software development system 1 according to the present embodiment. The process executed by the software development device 100 shown in FIG. 6 may be typically realized by the processor 102 of the software development device 100 executing the software development program 114. Similarly, the process executed by the verification server 200 may be typically realized by the processor 202 of the verification server 200 executing a necessary program.

Referring to FIG. 6, the software development device 100 generates the source code 10 according to the user operation (step S100). After generating the source code 10, the software development device 100 compiles the source code 10 according to the user operation to generate the intermediate representation 20 from the source code 10 (step S102).

The software development device 100 requests the verification server 200 to verify the generated intermediate representation 20 (step S104), and waits for a response from the verification server 200 (step S106). In response to the verification request from the software development device 100, the verification server 200 verifies the requested intermediate representation 20 (step S200).

That is, in steps S104 and S200, a process of verifying whether or not the intermediate representation 20 satisfies a predetermined rule or regulation is executed.

If the verification result is appropriate (YES in step S202), the software development device 100 responds to the software development device 100 with the authentication for the intermediate representation 20 (step S204). On the other hand, if the verification result is not appropriate (NO in step S202), the software development device 100 does not give authentication to the intermediate representation 20 and responds to the software development device 100 that the verification result is inappropriate (step S206).

When the verification server 200 responds with the authentication for the intermediate representation 20 (YES in step S108), the software development device 100 generates the execution code 30 from the target intermediate representation 20 (step S110). Then, the software development device 100 transmits the generated execution code 30 to the target controller 300 (step S112). Then, the process ends.

Thus, when the intermediate representation 20 satisfies a predetermined rule or regulation, the execution of the execution code 30 generated from the intermediate representation 20 is realized.

On the other hand, if the verification server 200 does not respond with the authentication for the intermediate representation 20 (NO in step S108), the software development device 100 notifies the user that the source code 10 or the intermediate representation 20 does not satisfy the predetermined rule or regulation (step S114). Thus, when the intermediate representation 20 does not satisfy a predetermined rule or regulation, a process of notifying the user of the content that the predetermined rule or regulation is not satisfied may be adopted. Then, the process ends.

E. Execution Environment

The execution code 30 generated in the software development system 1 according to the present embodiment is preferably stored in the secure area of a processor or a microcomputer configuring the controller 300 at the distribution destination. That is, it is preferable to take some measures in the execution environment so that the execution code 30 generated on condition that the intermediate representation 20 is authenticated is not falsified.

In addition, a signature (for example, a hash value generated from the authenticated intermediate representation 20) common to both the certificate 40 for the intermediate representation 20 generated in the software development system 1 according to the present embodiment and the execution code 30 generated from the intermediate representation 20 may be embedded, and the condition may be the presence of the corresponding certificate 40. In this case, in the environment in which the execution code 30 is executed (typically, the firmware of the microcomputer), a process of checking the match between the signature included in the execution code 30 and the signature included in the corresponding certificate 40 may be implemented.

In addition, in the execution environment, the evaluation (determination of validity) of whether or not to execute the execution code 30 may be performed at any timing, but typically, may be performed when the controller 300, which is the execution environment, is started (during firmware startup or before the start of application execution immediately after the startup). That is, when the controller 300 in which the execution code 30 is executed is started, the validity of the execution code 30 may be evaluated based on the certificate 40 issued in association with the intermediate representation 20 from which the execution code 30 has been generated. By checking that the execution code 30 of the application program is authenticated when the controller 300 is started, it is possible to avoid a situation in which an unfavorable process is executed by the controller 300 or the like.

F. Modification Example

When the software development device 100 requests the verification server 200 to verify the intermediate representation 20, the target intermediate representation 20 may be encrypted. As a result, it is possible to prevent falsification of the intermediate representation 20 exchanged between the software development device 100 and the verification server 200.

The certificate 40 issued by the verification server 200 may be given a signature from a certificate authority or the like. As a result, it is possible to prevent fraudulent acts such as falsification of the certificate 40 issued by the verification server 200.

In the above description, a configuration example in which the software development device 100 executes the process of generating the source code 10, the process of generating the intermediate representation 20, and the process of generating the execution code 30 has been described. However, these processes may be executed in a distributed manner by a plurality of computing devices.

The framework for verifying the intermediate representation 20 and issuing the certificate 40 showing the verification result according to the present embodiment can also be applied to a mechanism for selling or distributing the application. For example, when an application developer uploads an application program (execution code 30) to an application distribution server, the application developer is requested to upload the application program (execution code 30) together with the corresponding intermediate representation 20 and/or certificate 40, so that the execution code 30 to be distributed can be directly or indirectly verified on the application distribution server side. In this manner, by introducing the mechanism according to the present embodiment, it is possible to avoid a situation in which an application program having a backdoor or the like is distributed.

G. Advantages

In the present embodiment, by verifying the intermediate representation 20 instead of the source code 10, the security risk included in the application program can be more efficiently found in a state in which the know-how and the like included in the source code 10 are concealed. In addition, by verifying the intermediate representation 20, it is not necessary to prepare a plurality of verification rule sets according to the type of programming language used in the description of the source code 10. As a result, it is possible to realize efficient verification.

It should be considered that the embodiment disclosed is an example in all points and not restrictive. The scope of the invention is defined by the claims rather than the above description, and is intended to include all modifications within the scope and meaning equivalent to the claims.

EXPLANATIONS OF LETTERS OR NUMERALS

1 SOFTWARE DEVELOPMENT SYSTEM
2 INTERNET
4 EDGE DEVICE
10 SOURCE CODE
20 INTERMEDIATE REPRESENTATION
30 EXECUTION CODE
40 CERTIFICATE
100 SOFTWARE DEVELOPMENT DEVICE
102, 202 PROCESSOR
104, 204 MAIN MEMORY
106, 206 INPUT UNIT
108, 208 DISPLAY
110, 210 HARD DISK
114 SOFTWARE DEVELOPMENT PROGRAM
120, 220 INTERNAL BUS
122, 222 COMMUNICATION INTERFACE
200 VERIFICATION SERVER
212 EVALUATION ENGINE
214 CERTIFICATE ISSUING ENGINE
216 EVALUATION RULE
300 CONTROLLER

The invention claimed is:

1. An execution code provision method, comprising:
generating a source code with a processor according to a user operation;
generating by the processor an intermediate representation from the source code;
determining by the processor whether the intermediate representation satisfies a predetermined rule or regulation, wherein determining whether the intermediate representation satisfies the predetermined rule or regulation comprises at least one of:
    determining that an error handling construct is included,
    determining that an undefined operation is not included, or
    determining that an irregular error handling is not included;
issuing a certificate associated with the intermediate representation when the intermediate representation satisfies the predetermined rule or regulation;
generating an execution code from the intermediate representation when the processor determines that the intermediate representation satisfies the predetermined rule or regulation; and
allowing execution of the execution code based on the certificate.

2. The execution code provision method according to claim 1, further comprising executing the execution code on condition that the intermediate representation satisfies the predetermined rule or regulation.

3. The execution code provision method according to 1, further comprising:
evaluating validity of the execution code based on the certificate issued in association with the intermediate representation, from which the execution code has been generated, when a controller in which the execution code is executed is started.

4. The execution code provision method according to claim 1,
wherein the determining includes notifying a user of a content that the predetermined rule or regulation is not satisfied when the intermediate representation does not satisfy the predetermined rule or regulation.

5. A software development system, comprising:
a software development device for supporting generation of a source code; and
a verification server accessible from the software development device,
wherein the software development device is configured to generate an intermediate representation from the source code,
the verification server is configured to determine whether the intermediate representation satisfies a predetermined rule or regulation and issue a certificate associated with the intermediate representation when the intermediate representation satisfies the predetermined rule or regulation, wherein determining whether the intermediate representation satisfies the predetermined rule or regulation comprises at least one of:
    determining that an error handling construct is included, determining that an undefined operation is not included, or determining that an irregular error handling is not included;

wherein when the intermediate representation satisfies the predetermined rule or regulation, an execution code is generated from the intermediate representation;

wherein the execution code is allowed to be executed based on the certificate.

6. The software development system according to claim 5, wherein the software development device is configured to generate the execution code on condition that the intermediate representation satisfies the predetermined rule or regulation.

7. The software development system according to 5, wherein validity of the execution code is evaluated based on the certificate issued in association with the intermediate representation, from which the execution code has been generated, when a controller in which the execution code is executed is started.

8. The software development system according to claim 5, wherein the verification server is configured to notify a user of a content that the predetermined rule or regulation is not satisfied when the intermediate representation does not satisfy the predetermined rule or regulation.

9. The execution code provision method according to claim 1, wherein determining whether the intermediate representation satisfies the predetermined rule or regulation further comprises determining that a backdoor does not exist.

10. The software development system according to claim 5, wherein determining whether the intermediate representation satisfies the predetermined rule or regulation further comprises determining that a backdoor does not exist.

* * * * *